May 22, 1962

R. G. PORTIS 3,035,604

RELIEF VALVE

Filed June 15, 1959

Inventor.
Ralph G. Portis.
By Zabel, Baker, York, Jones and Dithmar
Attorneys.

May 22, 1962

R. G. PORTIS 3,035,604

RELIEF VALVE

Filed June 15, 1959

Inventor,
Ralph G. Portis.
By Zabel, Baker, York, Jones and Dithmar
Attorneys.

United States Patent Office 3,035,604
Patented May 22, 1962

3,035,604
RELIEF VALVE
Ralph G. Portis, Chicago, Ill., assignor to Midland Manufacturing Corp., Chicago, Ill., a corporation of Illinois
Filed June 15, 1959, Ser. No. 820,178
2 Claims. (Cl. 137—327)

This invention relates to a relief valve, and more particularly to a spring loaded relief or safety valve designed for use in connection with containers for pressurized fluids.

One object of the invention is to provide a relief valve wherein the movable valve element is guided by means of two spaced bearings. As will be seen, the stem of the valve element engages these bearings and at all times is maintained in proper alignment with the remaining structure of the valve. This eliminates difficulties due to possible misalignment such as failure to close properly after an instance of opening.

Another object of the invention is to provide a two-bearing valve wherein one of the bearings readily is removable to provide access for periodic replacement of sealing rings, without depressurizing the container with which the valve is used. The removable bearing is part of a rigid external structure which serves to protect the valve from damage and which must be replaced after inserting new sealing rings.

Another object is to provide a relief valve which is characterized by the absence of vanes or other obstructions to fluid discharge in the vicinity of the restricted valve opening when the valve is in open condition. This feature gives the valve a higher discharge capacity than is possessed by prior valves of generally the same size which utilize vanes or other obstructions to flow which reduce the net discharge area of the restricted valve opening.

Relief valves, generally speaking, are graded on the basis of discharge capacity in cubic feet per minute of air. A limiting factor in the design of a spring loaded relief valve is the capability of the spring to function safely and reliably. Thus, safe spring loading dictates the gross size or area of the restricted valve opening which constitutes the pressure area of the valve. The absence of vanes or other obstructions on the stem of the present valve gives the valve a maximum net discharge area and hence a higher discharge capacity and increased efficiency, compared with prior valves which have elongated vanes or other obstructions on the valve stem in the vicinity of the restricted valve opening. It will be understood that vanes present large surface areas parallel to the discharge flow, and the attendant friction between the areas and the fluid reduces the discharge capacity. Also, the vane surfaces normal to the discharge flow are obstructions which cause turbulence and further reduce discharge capacity. As mentioned, the present valve is free of vanes or other obstructions in the region of the restricted valve opening when the valve is in open, discharging condition.

Another object is to provide a relief valve wherein the valve element is provided with a removable valve cap which cooperates with the valve element and other structure of the valve to give superior sealing characteristics.

Still another object is to provide a relief valve wherein the aforesaid valve cap has wrench-engaging flats and is locked to the valve stem, whereby a cap-securing nut threaded to the stem may be tightened and loosened by holding the valve cap rather than holding the bearing-engaging portion of the valve stem. This feature, of course, avoids damage to the bearing surface of the valve stem. Also, rotation of the valve element and associated sealing rings may be prevented by holding the valve cap, thus avoiding damage to the surfaces of the sealing rings such as would occur if the latter had relative rotative movement with engaged surfaces.

Another object is to provide a relief valve having a valve element and associated valve cap wherein there is a single annulus which defines the space which is subject to valve leakage. This space is located between the valve cap, valve body and the valve element. Annular sealing means occupy this annular space, and in the preferred form of the invention, two spaced annular sealing rings are used.

Still another object of the invention is to provide a relief valve having a stop and a cooperating shock absorbing bumper which engage when the valve opens abruptly under dangerous pressure. At this time the compression spring used in the valve is further compressed, but the stop prevents the spring from going "solid" and thus from possible permanent deformation.

Other objects, advantages and details of the invention will be apparent as the description proceeds, reference being had to the accompanying drawings wherein a preferred form of the invention is shown. It will be understood that the description and drawings are illustrative only and that the scope of the invention is to be measured by the appended claims.

Figure 1:
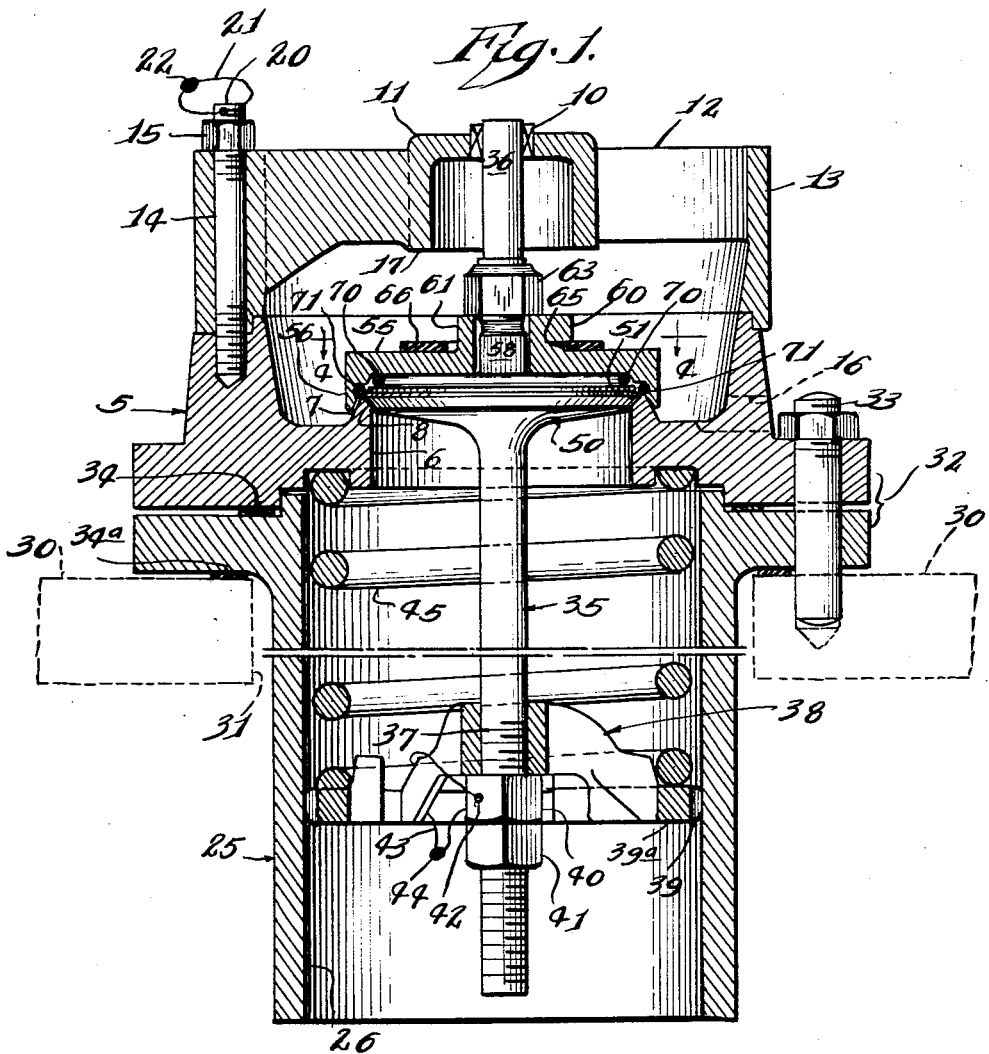
FIG. 1 is a longitudinal sectional view of a relief valve embodying the invention, the section being taken substantially on broken line 1—1 of FIG. 3.

Referring now to the drawings, the illustrated relief valve includes a valve body 5 having a central circular opening 6. Surrounding central opening 6 is an upstanding annular valve seat portion 7 having a tapered valve seat 8.

An annular bearing 10, hereinafter sometimes called a first annular bearing, is positioned axially outward of and in coaxial relation with central opening 6 of valve body 5. Bearing 10 is removably related to valve body 5, and as here shown is carried by an inverted cup-shaped member 11 which in turn is supported by radial vanes 12 extending inwardly from a skirt 13 which is secured to valve body 5 as by studs 14 and associated nuts 15. Thus, the sub-assembly including bearing 10, member 11, vanes 12 and skirt 13 is detachably secured to valve body 5, and is readily removable and replaceable. Also, the sub-assembly is rigid in character and thus provides protection to the valve from external forces.

Skirt 13 constitutes a stack pipe which provides a directed discharge of escaping fluid when the valve opens under excess pressure. Body 5 has spaced ports 16 (FIGS. 1 and 3) to discharge fluid from the outer portion of the valve.

Inwardly facing annular rim 17 of member 11 constitutes a bumper portion which cooperates, as will be seen to cushion shock when the valve opens and to provide a stop which limits compression of the spring to a safe amount.

The outer end of a stud 14 is provided with a transverse aperture 20 to receive a sealing wire 21, the ends of which are joined by a seal 22 in conventional manner. It is to be noted that the aforesaid sub-assembly necessarily must be replaced following removal for application of new sealing rings.

Valve body 5 includes an inwardly extending skirt 25 which constitutes an elongated annular bearing 26, sometimes hereinafter called a second annular bearing. This annular bearing 26 is positioned axially inwardly of and in coaxial relation with central opening 6 of valve body 5. As here shown, skirt 25 is a separate member, but it could be integral with valve body 5. Use of a separate member ordinarily is desirable because it enables adjustment of the valve without removing skirt 25 from the container in which the valve is mounted, and it also simplifies fabrication of the valve body.

Figure 3:
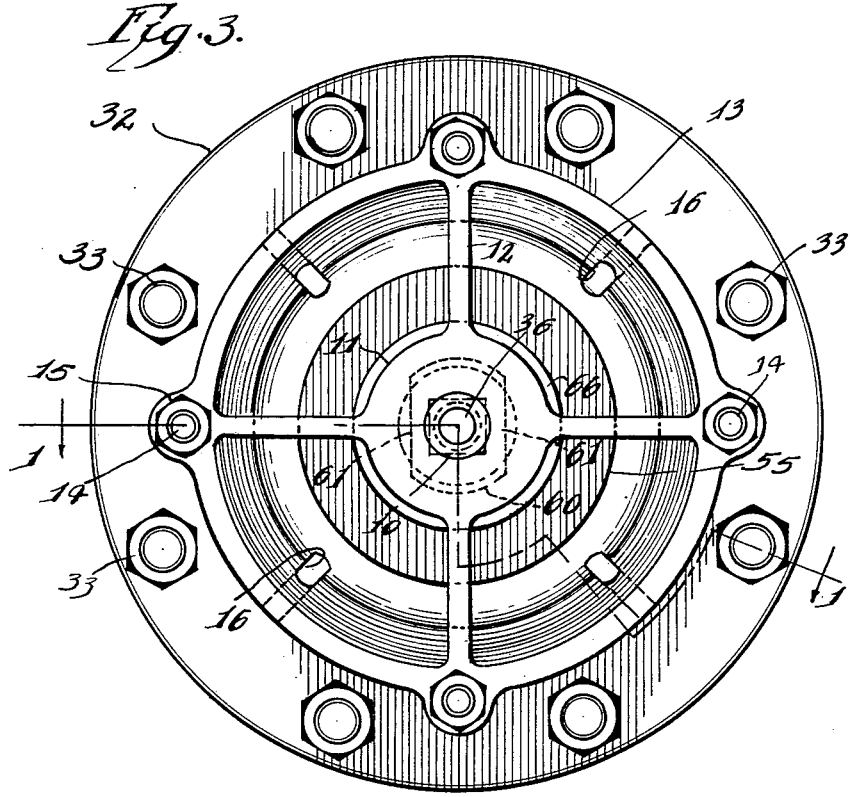
FIG. 3 is a top plan view of the valve.

A portion of the container in which the illustrated valve is mounted is designated 30, this portion having a circular opening 31 to receive the valve. Valve body 5 and, as here shown, skirt 25 have peripheral flange means 32 which bears on portion 30 surrounding opening 31. The valve is secured to portion 30 by suitable means such as peripherally spaced studs 33 extending from portion 30 through aligned openings in flange means 32, as best shown in FIGS. 1 and 3. Alternatively, flange means 32 on skirt 25 often is welded to portion 30 of the container.

When valve body 5 and skirt 25 comprise separate members, an annular gasket 34 is used between them. Also, when studs 33 are used, a gasket 34a is used between portion 30 and flange means 32.

A valve stem 35 extends longitudinally of the valve and through central opening 6, as best shown in FIG. 1. Outer end portion 36 of valve stem 35 is received in first annular bearing 10, and this end portion is suitably machined and polished for proper relation with the bearing.

Inner end portion 37 of valve stem 35 carries a spring follower 38 which, as here shown, takes the form of a spider having extended guides 39 on its peripheral portion 39a in engagement with second annular bearing 26. Stem end portion 37 is threaded and provided with a bottom adjusting nut 40 and a bottom lock nut 41 for properly adjusting the spring load to give desired valve opening pressure. Adjusting nut 40 has an aperture 42 for sealing wire 43 which passes around an arm of the spider follower. The wire ends are secured by a seal 44.

From the foregoing it will be seen that both ends of valve stem 35 are guided by bearings, thereby insuring proper stem alignment at all times and at all positions of the valve element. Also, outer bearing 10 is readily removable, as previously described.

A compression spring 45 surrounds valve stem 35 and has its ends respectively seated on valve body 5 and follower 38, thereby providing a force holding the valve closed.

Figure 2:
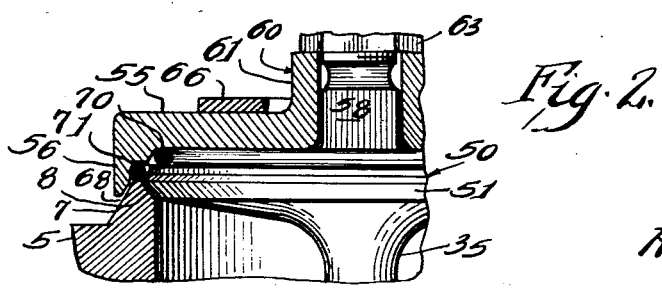
FIG. 2 is an enlarged fragmentary sectional view showing the shape and relationship of certain components of the valve.

A valve element 50 is carried on valve stem 35 intermediate to the stem end portions 36 and 37. Valve element 50 has a tapered valve seat 51, sometimes hereinafter called a tapered valve seating surface, which cooperates in conventional manner with first tapered valve seat 8 of valve body 5. This structure is best shown in FIG. 2. Valve element 50 operates in conventional manner to open and close the central opening 6 of valve body 5. It is to be noted that there are no vanes or other obstructions on valve stem 35 inwardly of valve element 50. Thus, when the valve is open there is no obstruction in the restricted valve opening to impede discharge, other than necessary stem 35.

A valve cap 55 is associated with valve stem 35 and valve element 50 as best shown in FIGS. 1 and 2. Valve cap 55 is slightly larger in diameter than valve element 50 and includes a peripheral annular flange 56 which exteriorly telescopes seat portion 7 of valve body 5 when the valve is closed.

Figure 4:
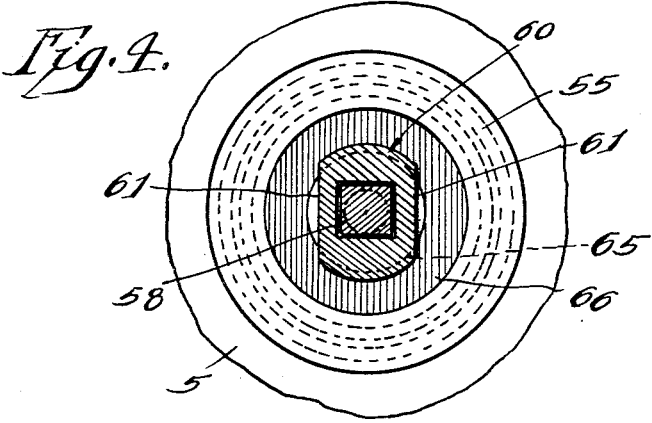
FIG. 4 is a fragmentary sectional view on line 4—4 of FIG. 1.

Portion 58 of valve stem 35 which passes through a central opening in valve cap 55 is non-circular in cross section, and the central opening in valve cap 55 has generally the same cross section (clearance is exaggerated in the drawing for clarity), whereby valve cap 55 is locked against rotation with respect to valve stem 35. As best shown in FIG. 4, valve cap 55 has a hub 60 which is provided with opposed flats 61. The latter are adapted to receive a wrench or other tool to hold valve cap 55 and stem 35 against turning when servicing the valve.

Valve stem 35 outwardly of portion 58 is threaded to receive a lock nut 63 which secures valve cap 55 to stem 35 and valve element 50. Flats 61 on valve cap 55 and the locked relationship between the latter and stem 35 enable nut 63 to be tightened and loosened without applying holding means to bearing end portion 36 of the valve stem. Valve cap 55 thus is readily removable when it is necessary to replace the sealing rings which will be described presently.

Hub 60 of valve cap 55 is undercut as shown at 65 (FIGS. 1 and 4) to receive an annular resilient element 66 which is thereby positioned in alignment with bumper portion or rim 17. When the valve opens abruptly, resilient element 66 may engage bumper portion or rim 17 and thereby cushion shock and prevent possible damage to the valve. Also, no hazardous sparking occurs when resilient element 66 engages rim 17.

The relationship between valve cap 55, valve element 50 and valve seat portion 7 of valve body 5 are best shown in enlarged FIG. 2. It will be noted that the inner face of valve cap 55 lies flush against the outer face of valve element 50. The axially outer portion of valve element 50 is reduced somewhat in cross section to provide an annular space between the periphery of the reduced portion and flange 56 of the valve cap. The periphery is recessed to receive an annular sealing ring, as will be seen.

Flange 56 also is radially spaced from the periphery of the unreduced portion of valve element 50. The inner face of flange 56 is recessed to provide an annular space to receive an annular sealing ring. Also, there is clearance between valve cap 55 and both valve element 50 and valve seat portion 7.

The spaces or clearances between these respective parts (valve body 5, valve element 50 and valve cap 55) comprise a single annulus so located in the valve as to receive any leakage which may occur between tapered valve seat 8 and tapered valve seating surface 51. In addition, it will be noted that clearance 68 is provided to the exterior between flange 56 and seat portion 7.

Sealing means is provided in the above described annulus to prevent leakage through the closed valve under pressures below that at which the spring bias permits the valve to open. In the form of the invention shown, this sealing means comprises a pair of spaced annular resilient sealing rings 70 and 71.

Ring 70 is carried by valve element 50 in the recess provided in the periphery of the axially outer portion of reduced cross section. Ring 70, which in position is compressed slightly, provides a seal against leakage between valve element 50 and valve cap 55.

The other ring 71 is carried by valve cap 55 in the recess provided on the interior of flange 56. Ring 71, which also is compressed slightly when the valve is closed, provides a seal between the outlet of tapered valve seat 8 and tapered valve seating surface 51 and the space 68 leading to the valve exterior.

Both rings 70 and 71 have the characteristic that leakage pressure causes them to distort further in a direction toward increased sealing. It will be noted that both rings are mounted on the same sub-assembly so they move together. Also, neither ring slides along another part when the valve actuates. Ring 71, when the valve is closed, engages the rim of valve seat portion 7 which slightly distorts the ring. Leakage pressure further distorts ring 71 to improve the seal for space 68, and also distorts ring 70 to improve the seal against leakage between the engaging surfaces of valve element 50 and valve cap 55.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A relief valve comprising a valve body having a central circular opening and an upstanding annular valve seat portion including a tapered valve seat surrounding said opening, a first annular bearing including an annular bumper portion and stack pipe positioned axially outwardly of and in coaxial relation with said opening and removably secured to said valve body, an elongated second annular bearing on said valve body and positioned axially inwardly of and in coaxial relation with said opening, a valve stem extending through said opening with one end portion slidably received in said first annular bearing, a follower adjustably mounted on the other stem end portion and in slidable engagement with said second annular bearing, a compression spring having its ends respectively seated on said valve body and said follower, a valve element on said stem intermediate the ends thereof including a tapered valve seating surface for cooperation with said tapered valve seat, said spring urging said valve element to valve closed position, a valve cap mounted non-rotatably on said valve stem and overlying said valve element, said valve cap having tool-engaging flats, a nut in threaded relation with said valve stem and securing said valve cap to said valve element, said valve cap flats and said nut engageable with tools for imparting relative rotational movement thereto, said valve cap having an annular flange exteriorly telescoping said valve seat portion when the valve is closed and defining with said valve element and said seat portion a single annular space between said cap and both said valve body and said valve element, and a pair of spaced annular resilient sealing rings in said space, one ring sealingly engaging said seat portion and said valve cap in the valve closed position and the other ring sealingly engaging said valve cap and said valve element to seal against leakage therebetween, said sealing rings adapted to deform under valve leak pressure to increase the sealing characteristics thereof, said valve stem, when the valve is open, constituting the sole structure within said central opening of said valve body, thereby maximizing the discharge capacity of the valve.

2. A relief valve comprising a valve body having a central circular opening and an upstanding annular valve seat portion including a tapered valve seat surrounding said opening, a first annular bearing positioned axially outwardly of and in coaxial relation with said opening and secured to said valve body, an elongated second annular bearing on said valve body and positioned axially inwardly of and in coaxial relation with said opening, a valve stem extending through said opening with one end portion slidably received in said first annular bearing, a follower adjustably mounted on the other stem end portion and in slidable engagement with said second annular bearing, a spring having its ends respectively seated on said valve body and said follower, a valve element on said stem intermediate the ends thereof including a tapered valve seating surface for cooperation with said tapered valve seat, said spring urging said valve element to valve closed position, a valve cap detachably and non-rotatably mounted on said valve stem and overlying said valve element, said valve cap having tool-engaging flats, a nut in threaded relation with said stem and securing said valve cap to said valve element, said valve cap flats and said nut engageable with tools for imparting relative rotational movement thereto, said valve cap exteriorly telescoping said valve seat portion when the valve is closed and defining with said valve element and said seat portion a single annular space between said cap and both said valve body and said valve element, and a pair of spaced annular resilient sealing rings in said space, one ring sealingly engaging said seat portion and said valve cap in the valve closed position and the other ring sealingly engaging said valve cap and said valve element to seal against leakage therebetween, said sealing rings adapted to deform under valve leak pressure to increase the sealing characteristics thereof, said valve stem, when the valve is open, constituting the sole structure within said central opening of said valve body, thereby maximizing the discharge capacity of the valve.

References Cited in the file of this patent
UNITED STATES PATENTS

| | | |
|---|---|---|
| 308,479 | Falk | Nov. 25, 1884 |
| 827,716 | Eastwood | Aug. 7, 1906 |
| 1,785,278 | MacClatchie | Dec. 16, 1930 |
| 2,599,622 | Folmsbee | June 10, 1952 |
| 2,608,992 | Folmsbee | Sept. 2, 1952 |